(12) United States Patent
Van Niekerk et al.

(10) Patent No.: US 11,266,209 B2
(45) Date of Patent: Mar. 8, 2022

(54) FUNCTIONAL ELEMENT COMPRISING A BALL-LIKE WELDED ELEMENT, COMBINATION OF COMPONENTS COMPRISING A FUNCTIONAL ELEMENT OF SAID TYPE, AND METHOD FOR MANUFACTURING A COMBINATION OF COMPONENTS OF SAID TYPE

(71) Applicant: Bayerische Motoren Werke Aktiengesellschaft, Munich (DE)

(72) Inventors: Johann Van Niekerk, Munich (DE); Christian Dunckern, Puchheim (DE); Maik Hammer, Bruckberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1349 days.

(21) Appl. No.: 15/099,743

(22) Filed: Apr. 15, 2016

(65) Prior Publication Data
US 2016/0227886 A1    Aug. 11, 2016

Related U.S. Application Data

(63) Continuation of application No. PCT/EP2014/077125, filed on Dec. 10, 2014.

(30) Foreign Application Priority Data

Jan. 9, 2014    (DE) ...................... 10 2014 200 210.9

(51) Int. Cl.
*A44B 17/00*   (2006.01)
*F16B 5/06*    (2006.01)
(Continued)

(52) U.S. Cl.
CPC ........ *A44B 17/007* (2013.01); *A44B 17/0023* (2013.01); *A44B 17/0041* (2013.01);
(Continued)

(58) Field of Classification Search
CPC ............ A44B 17/0023; A44B 17/0041; A44B 17/007; B21D 39/031; B23K 31/02;
(Continued)

(56) References Cited

U.S. PATENT DOCUMENTS 2,187,296 A * 1/1940 Appel ................ A44B 17/0052
24/692
2,275,900 A * 3/1942 Hall ..................... B23K 11/002
52/511

(Continued)

FOREIGN PATENT DOCUMENTS

CN     201193059 Y     2/2009
CN     102834218 A     12/2012
(Continued)

OTHER PUBLICATIONS

Chinese-language Office Action issued in counterpart Chinese Application No. 201480057800.5 dated Jul. 13, 2017 with English translation (16 pages).

(Continued)

*Primary Examiner* — Matthew R McMahon
(74) *Attorney, Agent, or Firm* — Crowell & Moring LLP

(57) ABSTRACT

A method is provided for manufacturing a combination of components. The method includes the following steps: manufacturing a functional element by providing a plate-type base element and integrally bonding a ball or a ball-shaped element to the plate-type base element, in particular by welding a ball or a ball-shaped element onto a flat plate-type element, and joining the functional element to a first component.

6 Claims, 1 Drawing Sheet

(51) Int. Cl.
  *B23K 31/02* (2006.01)
  *B21D 39/03* (2006.01)
  *F16B 5/08* (2006.01)
  *B23K 101/18* (2006.01)
  *B23K 101/00* (2006.01)

(52) U.S. Cl.
  CPC ............ *B21D 39/031* (2013.01); *B23K 31/02* (2013.01); *F16B 5/065* (2013.01); *F16B 5/0657* (2013.01); *B23K 2101/006* (2018.08); *B23K 2101/18* (2018.08); *F16B 5/08* (2013.01)

(58) Field of Classification Search
  CPC .......... B23K 2201/006; B23K 2201/18; B23K 2101/006; B23K 2101/18; F16B 5/065; F16B 5/0657; F16B 5/08; F16B 5/0664
  USPC .............. 403/266, 268, 270, 271; 219/137 R
  See application file for complete search history.

(56) References Cited

U.S. PATENT DOCUMENTS

| | | | | |
|---|---|---|---|---|
| 3,153,468 | A * | 10/1964 | Sweeney | F16B 5/128 52/716.5 |
| 3,188,731 | A * | 6/1965 | Sweeney | F16B 5/128 29/430 |
| 3,243,858 | A * | 4/1966 | Melanson | A44B 17/0029 24/693 |
| 3,340,379 | A * | 9/1967 | Sweeney | B23K 11/14 219/99 |
| 3,367,082 | A * | 2/1968 | Meyer | F16B 5/128 52/718.04 |
| 3,724,150 | A * | 4/1973 | Hudnall | E04F 19/08 174/486 |
| 3,916,756 | A * | 11/1975 | Yoda | F16B 21/073 24/682.1 |
| 4,120,641 | A * | 10/1978 | Myles | F27D 1/002 156/279 |
| 4,337,974 | A * | 7/1982 | Kohlpaintner | B60J 7/02 296/213 |
| 4,408,372 | A * | 10/1983 | Kimura | F16B 21/073 24/662 |
| 4,408,708 | A * | 10/1983 | Delcour | F27D 3/02 228/139 |
| 4,637,116 | A * | 1/1987 | Parisch | B60J 7/02 228/115 |
| 4,752,026 | A * | 6/1988 | Van De Griend | B23K 11/004 228/120 |
| 4,805,272 | A * | 2/1989 | Yamaguchi | A41H 37/001 24/623 |
| 5,580,204 | A * | 12/1996 | Hultman | F16B 5/065 24/297 |
| 6,199,248 | B1 * | 3/2001 | Akashi | A41H 37/001 24/114.6 |
| 6,260,240 | B1 * | 7/2001 | Akashi | A44B 17/0029 24/114.4 |
| 9,296,923 | B2 * | 3/2016 | Herzinger | F16B 11/006 |
| 9,687,928 | B2 * | 6/2017 | Van Niekerk | F16B 5/08 |
| 9,873,186 | B2 * | 1/2018 | Herzinger | B23K 31/02 |
| 2006/0140710 | A1 * | 6/2006 | Egner-Walter | B60S 1/24 403/122 |
| 2009/0070983 | A1 | 3/2009 | Stumpf et al. | |
| 2009/0140112 | A1 * | 6/2009 | Carnevali | F16B 5/0657 248/223.41 |
| 2010/0230469 | A1 * | 9/2010 | Iida | B23K 3/0623 228/18 |
| 2013/0036594 | A1 | 2/2013 | Hammer et al. | |
| 2013/0071181 | A1 | 3/2013 | Herzinger et al. | |
| 2013/0185916 | A1 | 7/2013 | Mantei et al. | |
| 2013/0212858 | A1 | 8/2013 | Herzinger et al. | |
| 2013/0270229 | A1 | 10/2013 | Pedersen et al. | |
| 2014/0201959 | A1 * | 7/2014 | Van Niekerk | F16B 5/0657 24/455 |
| 2014/0294488 | A1 | 10/2014 | Van Niekerk et al. | |
| 2015/0033532 | A1 | 2/2015 | Van Niekerk et al. | |
| 2016/0256958 | A1 * | 9/2016 | Van Niekerk | B23K 26/26 |
| 2016/0303691 | A1 * | 10/2016 | Hammer | B23K 26/0884 |

FOREIGN PATENT DOCUMENTS

| | | |
|---|---|---|
| CN | 102834626 A | 12/2012 |
| CN | 103079749 A | 5/2013 |
| CN | 103124670 A | 5/2013 |
| CN | 103974800 A | 8/2014 |
| DE | 10 2007 044 635 A1 | 4/2009 |
| DE | 10 2010 041 356 A1 | 3/2012 |
| DE | 10 2012 206 938 B3 | 2/2013 |
| DE | 10 2012 203 217 A1 | 9/2013 |
| GB | 2 447 625 A | 9/2008 |
| WO | WO 2012/031652 A1 | 3/2012 |

OTHER PUBLICATIONS

Chinese-language Office Action issued in counterpart Chinese Application No. 201480057800.5 dated Feb. 6, 2018 (seven (7) pages).
International Search Report (PCT/ISA/210) issued in PCT Application No. PCT/EP2014/077125 dated Apr. 1, 2015 with English translation (eight pages).
German-language Written Opinion (PCT/ISA/237) issued in PCT Application No. PCT/EP2014/077125 dated Apr. 1, 2015 (five pages).
German-language Office Action issued in counterpart German Application No. 10 2014 200 210.9 dated Nov. 25, 2014 (5 pages).

* cited by examiner

FUNCTIONAL ELEMENT COMPRISING A BALL-LIKE WELDED ELEMENT, COMBINATION OF COMPONENTS COMPRISING A FUNCTIONAL ELEMENT OF SAID TYPE, AND METHOD FOR MANUFACTURING A COMBINATION OF COMPONENTS OF SAID TYPE

CROSS REFERENCE TO RELATED APPLICATIONS

This application is a continuation of PCT International Application No. PCT/EP2014/077125, filed Dec. 10, 2014, which claims priority under 35 U.S.C. § 119 from German Patent Application No. 10 2014 200 210.9, filed Jan. 9, 2014, the entire disclosures of which are herein expressly incorporated by reference.

BACKGROUND AND SUMMARY OF THE INVENTION

The present invention relates to a functional element comprising a ball-like welded element, a combination of components comprising a functional element of said type, and a method for manufacturing a combination of components of said type.

WO 2012031652 A1 discloses a component connection having a first component, from which a male fixing element protrudes that is clamped into a hole which is provided in a second component. The male fixing element has a functional head which has partially or completely the shape of a ball or partially or completely a ball-like shape, and which is oversized substantially transversely with respect to the introduction direction in relation to the hole provided in the second component. Furthermore, the functional element has a base region which protrudes from the functional head and can be configured as a punch rivet.

It is an object of the invention:
to provide an alternative functional element which can be used in a versatile manner,
to provide a combination of components which has a functional element of this type,
to provide a method for manufacturing a combination of components.

This and other objects are achieved in accordance with embodiments of the invention.

A functional element according to the invention is distinguished by a plate-like main element, onto which a ball or a ball-like element is welded. The functional element is provided and intended to be connected to another component via its plate-like main element, in particular exclusively via its plate-like main element.

The plate-like main element can be, for example, of circular design. Furthermore, it can be of flat configuration, that is to say it can be configured as a flat plate.

According to one development of the invention, the plate-like main element has a circumferential edge which is "uneven". For example, an indentation or depression can be provided on the edge, or a plurality of indentations or depressions can be provided. As an alternative to this, the circumferential edge can have a groove-like, channel-like or serrated configuration. Furthermore, the circumferential edge can have a profiling or grooving. Geometric features of this type of the circumferential edge make possible a particularly intimate and high-strength connection of the main element to a first component, into which the main element of the functional element can be pressed (see below).

The functional element according to the invention is therefore suitable, in particular, for manufacturing a combination of components. A combination of components of this type has a first component, to which the functional element is connected. As has already been mentioned, it can be provided that the functional element is connected via its main element to the first component. In particular, it can be provided that the main element of the functional element is exclusively connected directly to the first component, that is to say the ball or the ball-like element is not connected directly to the first component, but rather merely indirectly via the main element.

It can be provided that a second component is clipped or clipped fixedly or clamped or clamped fixedly onto the ball or the ball-like element. A convex geometry, such as a ball or a ball-like element has the advantage that tilting is ruled out per se during clipping on or clipping fixedly.

Very high pulling forces can be achieved via a clip element which interacts with the ball or with the ball-like element. During clipping fixedly or clamping fixedly of a second component to the ball or the ball-like element of the functional element, the second component or an elastic clamping element (for example, a clamping jaw) which protrudes from the second component engages into a region between an equatorial plane of the ball or the ball-like element and an upper side of the first component, which results in an "undercut" which opposes a pulling force which acts on the second component.

It is to be noted expressly that the invention is not restricted to functional elements which have a single ball or a single ball-like element. Rather, the invention also includes functional elements, in which an element which is formed by way of a plurality of balls and/or by way of a plurality of ball-like elements protrudes from the plate-like main element. The simplest case of an element of this type is a "double ball", that is to say an arrangement, in which a first ball or a first ball-like element is connected to the main element and a second ball or a second ball-like element is connected to the first ball. The two balls can be arranged in a row immediately next to one another, in a similar manner to the case of pearls in a pearl necklace. As an alternative, they can also be connected to one another via a connecting element, in a similar manner to the case of a dumbbell.

In the following text, a method for manufacturing a combination of components according to the invention will be described. First of all, the functional element according to the invention is manufactured by a ball or a ball-like element being applied to a plate-like main element. The ball or the ball-like element is connected to the plate-like main element, for example, in an integrally joined manner. It can be provided, for example, that the ball or the ball-like element is welded onto the plate-like main element. Subsequently, the functional element which is formed by the main element and at least one ball or one ball-like element is connected to a first component.

The connection of the functional element to the first component can be carried out, for example, in an automated manner by use of a robot. It can be provided that the functional element is guided up to the first component by a robot, the robot guiding and aligning the functional element by gripping the functional element on the ball or the ball-like element.

The functional element can be connected in an integrally joined manner to the first component. It can be provided, in particular, that the main element of the functional element is connected in an integrally joined manner to the first component, for example by way of welding via a welding robot.

In particular, laser welding is suitable as a welding method, since the functional element can be welded to the first component at a certain distance by way of laser welding, without it being necessary for the welding apparatus to be guided directly up to the functional element or up to the first component.

Alternatively or additionally, the functional element can be connected in a positively locking manner to the first component. For example, the main element of the functional element can be pressed into the first component. The pressing-in operation can take place, for example, in a pressing or deep-drawing tool, by which the first component is pressed or deep-drawn into a different shape. The pressing-in tool which is used for this purpose can therefore be an integral constituent part of a pressing or deep-drawing tool. The pressing-in operation can optionally take place before the reshaping (pressing or deep-drawing) of the first component or after the reshaping.

As an alternative, the main element of the functional element could also be punched into the first component by use of a punching tool and could be connected to the first component in a positively locking manner. It also is possible for the punching tool to be an integral constituent part of a pressing or deep-drawing tool.

As another alternative, the main element of the functional element can be connected to the first component in a positively locking manner by way of clinching or pressing. It also is possible here for the clinching tool which is used for this purpose to be an integral constituent part of a pressing or deep-drawing tool. It can be provided, for example, that, before the connection of the functional element to the first component, a recess/depression or a through hole is produced in the first component, into which recess/depression or into which through hole the main element of the functional element is inserted or pressed in or clinched in.

Instead of a clip element which is to be clipped onto the ball or onto the ball-like element, a second component can also be clipped or clamped directly onto the ball or the ball-like element. For example, the second component can be a sheet metal part which has a through hole, the ball or the ball-like element being introduced into the through hole of the second component in a clamping manner.

It can be provided that the functional element consists of a different material than the first component. For example, the functional element can consist of steel and the first component can consist of aluminum. By way of pressing, punching or clinching the main element of the functional element into the first component, a high-strength connection can be produced between the functional element and the first component by way of a positively locking connection even in the case of different materials.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
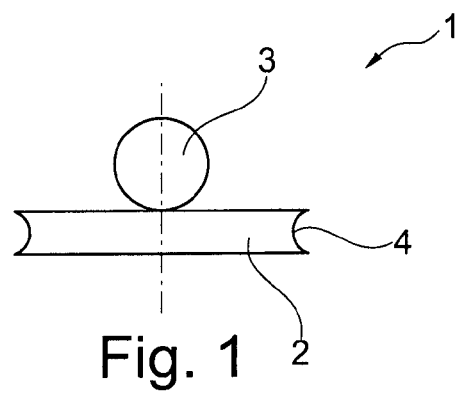
FIG. 1 is a diagram showing one exemplary embodiment of a functional element according to the invention.

FIG. 1 shows a functional element 1 which has a plate-like main element 2 and a ball 3 or a ball-like element which is connected thereto. The functional element 1 can be manufactured from metal, in particular from steel or aluminum. The ball 3 or the ball-like element can be welded onto the main element 2.

In the exemplary embodiment shown here, the main element 2 is configured so as to be flat and in the form of a circular plate. Here, a circumferential edge 4 of the main element 2 has a groove-shaped or channel-shaped design. As an alternative to this, the edge 4 might also be profiled, that is to say provided with depressions or elevations. It is advantageous if the edge is not straight or smooth, but rather has a "profiling" in the form of a circumferential groove, grooving, a multiplicity of elevations or depressions or the like, since the edge can then "mesh" with a first component in a very satisfactory manner during pressing of the main element 2 into the first component, which results in a high-strength positively locking connection.

Figure 2:
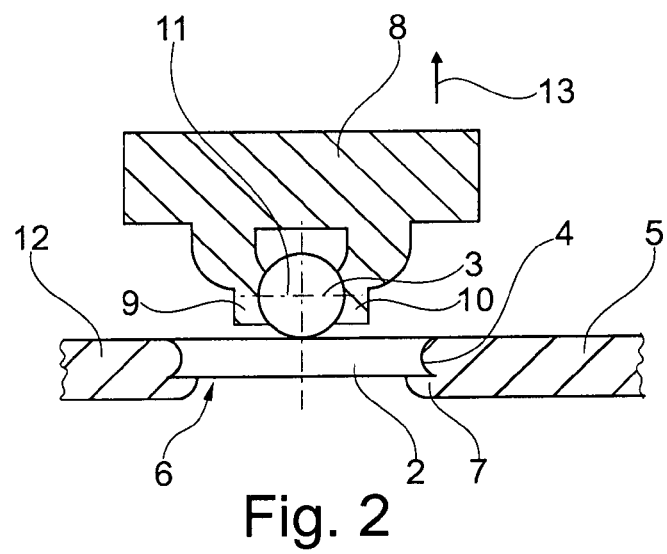
FIG. 2 is a diagram showing a functional element which is pressed into a first component and onto which a clip element is clipped.

In the exemplary embodiment shown in FIG. 2, a functional element 1, as shown in FIG. 1, is pressed by way of its main element 2 into a first component 5. A through hole 6 is provided in the first component 5. During pressing in of the main element 2, material of the first component 5 flows into the channel-like depression 4, which results in an undercut, via which the main element 2 is connected to the first component 5 in a positively locking and non-releasable manner. In the exemplary embodiment which is shown in FIG. 2, an edge 7 of the hole covers the main element 2 to a certain extent, which results in an additional undercut.

A clip element 8 is clipped onto the ball 3 of the functional element 1. The clip element 8 which is shown here has concavely designed clamping jaws 9, 10 which bear tightly from the outside against the ball 3. As can be seen from FIG. 2, the clamping jaws 9, 10 bear against the ball, in particular, in a region between an equatorial plane 11 of the ball 3 and an upper side 12 of the main element 2 or the first component 5. This results in an undercut which counteracts a pulling force 13 which acts on the second component 8 or on the clip element 8.

Figure 3:
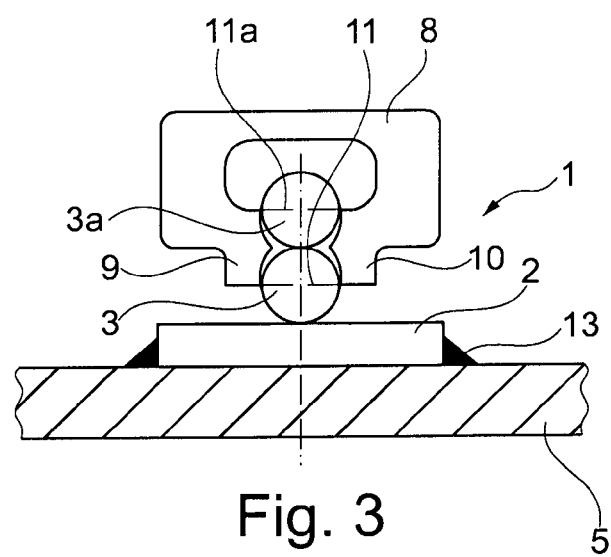
FIG. 3 is a diagram showing functional element which has a double ball and onto which a clip element is clipped.

FIG. 3 shows an exemplary embodiment, in which a functional element 1 is used having a "double ball" construction. A first ball 3 is welded onto the main element 2 and a second ball 3a, which adjoins said first ball 3 in the manner of a pearl necklace, is welded onto the first ball 3. A clip element 8 is clipped onto the "double ball" which is formed by the two balls 3, 3a, the clamping jaws of said clip element 8 engaging into a region which is situated between the two equatorial planes 11, 11a of the balls 3, 3a. This results in an undercut which counteracts a pulling force which acts on the clip element 8.

It is to be mentioned expressly that individual balls or spherical elements can be welded on sequentially or, as an alternative, individual balls or spherical elements can first of all be welded to one another and the "multiple ball" which is formed by the plurality of balls or spherical elements which are welded to one another is subsequently welded onto the first component.

In the exemplary embodiment which is shown in FIG. 3, the main element 2 is connected to the first component 5 via a welded connection 13.

As an alternative, it goes without saying that, in this exemplary embodiment, the main element 2 of the functional element 1 might also be connected in a positively locking manner to the first component, for example by way of pressing or punching of the main element 2 into the first component 5 or by way of clinching of the main element 2 to the first component 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A combination of components, comprising:
   a first component;
   a functional element connected to the first component, the functional element having a plate-shaped main element, to which a ball or a ball-shaped element has been connected before the connection of the functional element to the first component via welding of the ball or the ball-shaped element onto the plate-shaped main element;
   wherein the plate-shaped main element has a circumferential edge with an indentation or a depression;
   wherein the first component defines a through hole with an edge;
   wherein the plate-shaped main element is disposed in the through hole of the first component such that the edge of the through hole is received in the circumferential edge of the plate-shaped main element to result in a first undercut of the edge of the through hole with respect to a first surface of the plate-shaped main element.

2. The combination of components as claimed in claim 1, further comprising a second component clipped or clamped fixedly to the ball or the ball-shaped element.

3. The combination of components as claimed in claim 2, wherein the second component engages into a region which is situated between an equatorial plane of the ball or the ball-shaped element and an upper side of the main element or the first component, which region results in an undercut.

4. The combination of components as claimed in claim 3, wherein a second ball or a second ball-shaped element is fixed on the ball or the ball-shaped element.

5. The combination of components as claimed in claim 4, wherein the second component engages into a region which is situated between equatorial planes of the two balls or the two ball-shaped elements.

6. The combination of components as claimed in claim 1, wherein the plate-shaped main element is disposed in the through hole of the first component such that the edge of the through hole is received in the circumferential edge of the plate-shaped main element to result in a second undercut of the edge of the through hole with respect to a second surface of the plate-shaped main element.

* * * * *